D. C. GOFF.
MOTOR VEHICLE.
APPLICATION FILED JAN. 3, 1919.

1,321,430.

Patented Nov. 11, 1919.
2 SHEETS—SHEET 1.

INVENTOR
DOUGLAS C. GOFF
BY
ATTORNEYS

D. C. GOFF.
MOTOR VEHICLE.
APPLICATION FILED JAN. 3, 1919.

1,321,430.

Patented Nov. 11, 1919.
2 SHEETS—SHEET 2.

INVENTOR
DOUGLAS C. GOFF
BY
ATTORNEYS

UNITED STATES PATENT OFFICE.

DOUGLAS CAULKINS GOFF, OF KNOXVILLE, TENNESSEE.

MOTOR-VEHICLE.

1,321,430.  Specification of Letters Patent.  Patented Nov. 11, 1919.

Application filed January 3, 1919. Serial No. 269,423.

*To all whom it may concern:*

Be it known that I, DOUGLAS C. GOFF, a citizen of the United States, and a resident of Knoxville, in the county of Knox and State of Tennessee, have invented certain new and useful Improvements in Motor-Vehicles, of which the following is a specification.

My invention is an improvement in motor vehicles, and has for its object to provide mechanism in connection with motor vehicles of the truck type for housing the driving mechanism which connects the wheel with the transmission in an oil- and dust-tight compartment, so designed as to remain oil-tight and dust-proof through an extended period of use.

Figure 1:
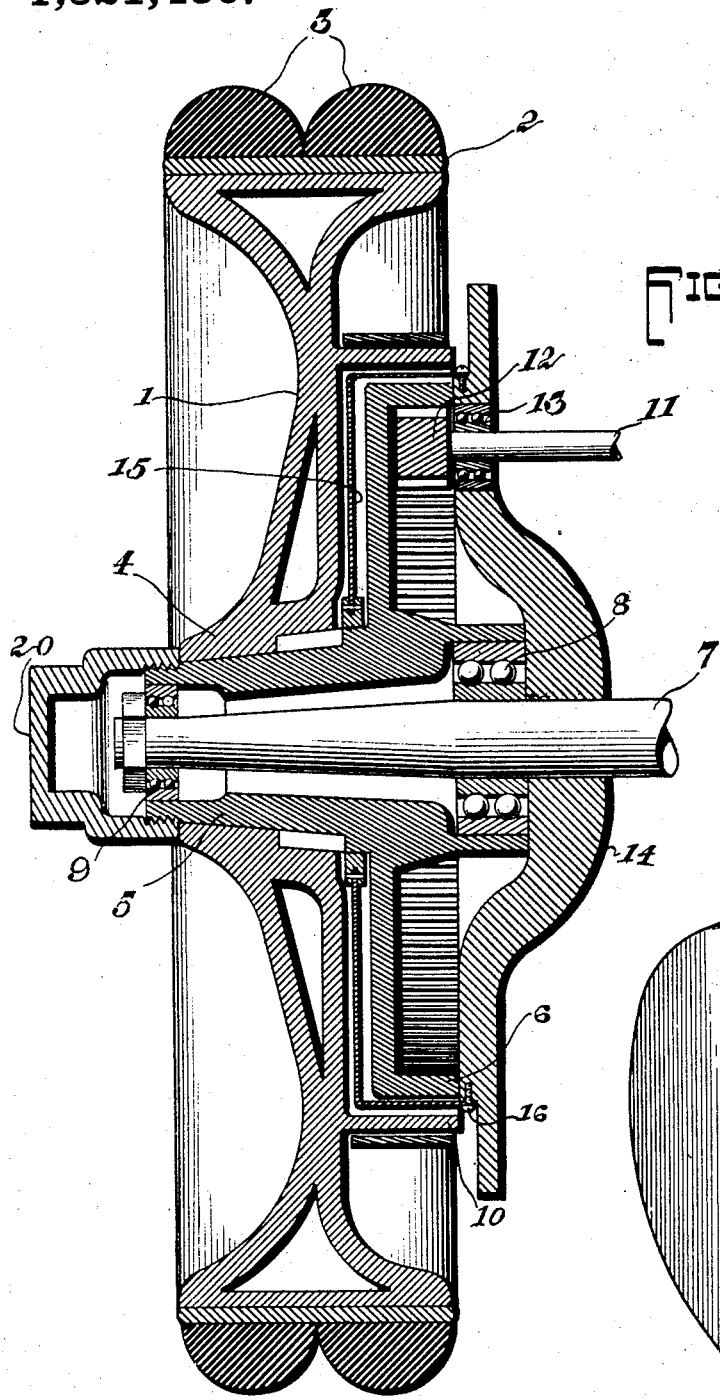
Figure 1 is a sectional view of a motor truck wheel having the improved housing.
Figure 2:
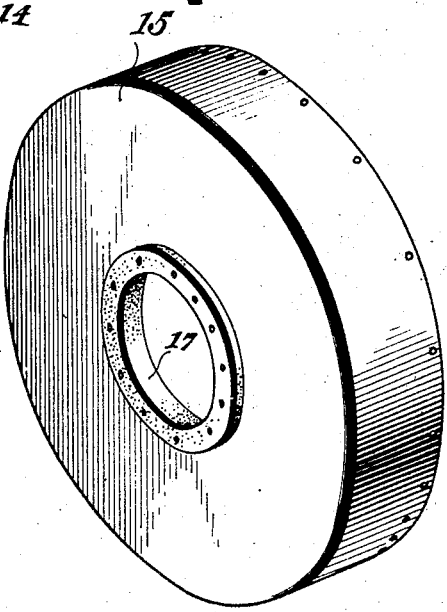
Fig. 2 is a perspective view of the inner section of the housing.
Figure 3:
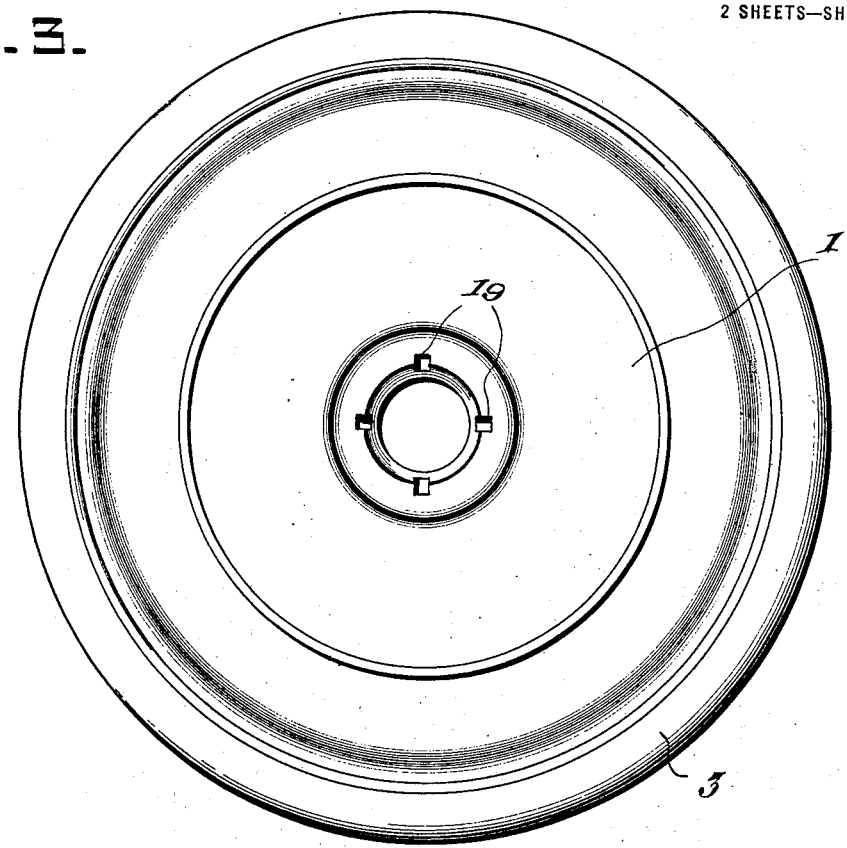
Fig. 3 is a side view of the wheel.
Figure 4:
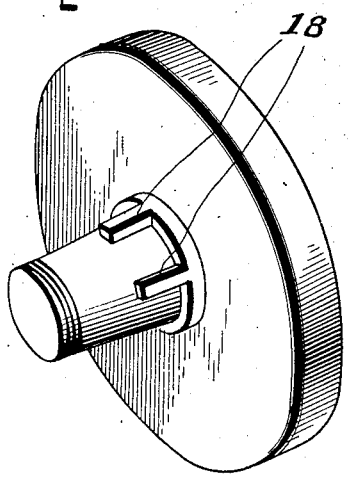
Fig. 4 is a perspective view of the hub and the internal gear.

In the present embodiment of the invention the truck wheel comprises a wheel portion 1, upon which is mounted a rim 2 carrying one or more treads 3 of solid rubber or the like, and this wheel 1 has a tapering hub portion 4. A hub 5 is provided for engaging within the hub portion 4, and this hub is tapering, as is also the bore of the hub portion 4 of the wheel, and at its large end the hub carries an internal gear 6, coaxial with the hub and connected thereto by a web, as shown.

The spindle 7 is journaled in the hub, ball bearings 8 and 9 being interposed between the hub and the spindle, and this internal gear fits within the brake ring 10 which is integral with the wheel 1, and extends laterally from the inner face thereof.

The rear axle countershaft 11 which carries the pinion 12 meshing with the teeth of the internal gear 6 is mounted in a ball bearing 13 which is held in a cover plate 14 journaled on the spindle 7 and engaging the inner end of the hub 5, and extending to the inner edge of the internal gear. This cover plate 14 is one section of a housing, the other section 15 being a ring having a central opening for the hub and a marginal flange extending toward the cover plate. The cover plate has an annular shoulder over which the edge of the flange extends, and screws 16 are provided for securing the said edge to the shoulder. The edge of the opening has secured thereto a ring 17 of felt or like material, and this ring of felt engages the surface of the hub, forming a tight closure at this point.

The wheel 1 is constrained to rotate with the hub by means of lugs 18 on the hub, which engage keyways 19 in the hub portion of the wheel, and the wheel is held on the hub by means of a hub cap or nut 20.

The chamber formed by the sections 14 and 15 of the housing forms a fluid tight receptacle for lubricant. The washer 17 prevents escape of the lubricant outwardly, and the connection between the flange and the ring 15 and the cover plate 14 prevents the escape of the oil in that direction. The internal gear and the pinion will run in a bath of oil which will retain them perfectly lubricated.

I claim:

In combination, a wheel having a hub portion and carrying a coaxial brake ring, a hub fitting within said hub portion and carrying an internal gear at one end and being adapted to receive a spindle, a pinion within the internal gear and meshing therewith, a countershaft to which the pinion is secured, an oil-tight housing supported by the spindle and inclosing the internal gear and the pinion and adapted to contain a lubricant, said housing comprising a ring or spider through which the spindle and the shaft of the pinion extend, and a cover consisting of a ring having an opening for the hub and arranged between the internal gear and the wheel and having a marginal flange extending between the brake ring and the internal gear and beyond said ring and gear, the spider having an annular shoulder upon which the flange fits, and radially arranged screws connecting the flange to the shoulder, the cover having a ring of flexible material secured thereto and engaging the periphery of the hub to make an oil-tight joint.

DOUGLAS CAULKINS GOFF.

Witnesses:
 MATTIE C. DUNNAVANT,
 EDMUND H. DYER.